United States Patent Office

3,537,996
Patented Nov. 3, 1970

1

3,537,996
MANUFACTURE OF OVERBASED CALCIUM SULFONATE LUBRICATING OIL COMPOSITIONS
Edward H. Holst, Robert S. Edwards, and John E. May, Nederland, Tex., assignors to Texaco Inc., New York, N.Y., a corporation of Delaware
No Drawing. Filed Dec. 12, 1967, Ser. No. 689,804
Int. Cl. C10m 1/40
U.S. Cl. 252—33                                  7 Claims

ABSTRACT OF THE DISCLOSURE

A process for the preparation of a lubricating oil composition of overbased calcium hydrocarbon sulfonate of improved filterability and clarity comprising preparing a mixture consisting of an oil soluble calcium sulfonate, hydrated lime having a calcium carbonate content less than 1.5 wt. percent, treating said initial mixture with sufficient carbon dioxide to convert between about 50 and 83 wt. percent of said hydrated lime to calcium carbonate, filtering the resultant carbonated mixture and recovering from the filtrate said composition which is useful in supplying anticorrosive properties to lubricating oils employed in internal combustion engines.

BACKGROUND OF THE INVENTION

Field of the invention

The field of art to which this invention pertains is in the processes of manufacturing compositions containing an inorganic calcium salt and a calcium salt of an organic acid in which the acid radical contains a sulfonic group.

Description of the prior art

In the past, many methods have been employed for the preparation of lubricating oil compositions containing overbased calcium sulfonate. One such method is described in U.S. 3,027,325, wherein overbased calcium sulfonate compositions are prepared by contacting a mixture of an oil soluble calcium sulfonate, calcium hydroxide and alcohol and at least 1 wt. percent water based on the petroleum oil solution of the calcium sulfonate and bubbling carbon dioxide therethrough at temperatures above about 30° C. and below the boiling point of the alcohol until the resulting mixture is substantially neutral. Another method is set forth in U.S. 3,312,618, wherein a substantially anhydrous mass consisting of a calcium sulfonate, hydrated lime, and alcohol is treated with $CO_2$ under substantially anhydrous conditions and terminating said $CO_2$ while at least a portion of said hydrated lime is in the free state. Although the prior methods readily produce a highly overbased calcium sulfonate lube oil composition, they often have the drawback of relatively slow filtration rates and thereby require costly and extensive filtration apparatus in order to obtain any meaningful production. Filtration of the final overbased calcium sulfonate lube oil composition is normally necessary since customer requirements require a clear solution and the product in a crude state often contains considerable solids predominantly undispersable, agglomerated calcium carbonate particles which require removal.

2

SUMMARY OF THE INVENTION

The invention pertains to a method of producing an overbased calcium sulfonate lubricating oil composition which has superior filtration properties, i.e., is readily filterable under conditions which produce a clear product. Specifically, we have discovered a calcium carbonate content associated with the hydrated lime in the initial reaction mixture above about 1.5 wt. percent based on said lime substantially impedes the filtration of the crude overbased sulfonate product during clarification. More specifically, the method of the invention comprises forming a clarified overbased calcium sulfonate lubricating oil composition comprising contacting an initial mixture of calcium sulfonate, hydrated lime, hydrocarbon lubricating oil and an alcohol selected from the group consisting of alkanol and alkoxyalkanol of from 1 to 5 carbons, said hydrated lime having a calcium carbonate content of less than 1.5 wt. percent, with carbon dioxide until between about 50 and 83% of said hydrated lime is converted to calcium carbonate, clarifying the resultant mixture via filtration and recovering said clarified overbased calcium sulfonate composition from the filtrate.

In explaantion of the term "overbased calcium sulfonate" normal calcium sulfonate can be described by the formula $(RSO_3)_2Ca$ where $RSO_3^-$ stands for the hydrocarbyl sulfonate radical. Since the number of hydrogen equivalents of calcium and of sulfonic acid moiety in normal calcium sulfonate are 2, the metal ratio in the normal calcium sulfonate is 1. Thus by the term "metal ratio" we mean the ratio equivalents of calcium to equivalents of sulfonic acid present in a particular mixture, e.g., in readily filterable dispersion in the case of our mixture. When the metal ratio is greater than about 2, that is, in a lubricating oil composition of the invention when the number of equivalents of calcium is substantally greater than the number of equivalents of hydrocarbyl sulfonic moiety then the composition is termed within our definition as "overbased."

DETAILED DESCRIPTION OF THE INVENTION

In detail the method of the invention comprises forming a clarified overbased calcium sulfonate lubricating oil composition having a calcium metal ratio greater than 2 and up to 30 or more, preferably between about 10 and 25, a calcium content of at least 3 wt. percent and up to 20 wt. percent and higher, preferably between 11 and 18 wt. percent and a total base number (TBN) as defined by ASTM D664 of at least about 50 and up to 500 or higher, desirably between about 280 and 450, said method comprising first forming an initial reaction mixture, preferably having a water content less than 1 wt. percent, composed of the following ingredients:

(a) An oil soluble calcium sulfonate reactant having a calcium metal ratio from about 1 to 2 selected from the group consisting of calcium petroleum sulfonate and calcium salts of synthetically prepared alkylated aromatic sulfonic acid. The sulfonic acids from which the sulfonate reactants are derived are adavntageously of a molecular weight of between about 350 and 600;

(b) Hydrated lime having a calcium carbonate content of less than 1.5 wt. percent;

(c) An alcohol selected from the group consisting of alkanol and alkoxyalkanol of from 1 to 5 carbons;

(d) A hydrocarbon lubricating oil having an SUS viscosity at 100° F. of between about 50 and 300;

(e) Optionally and preferably a volatile inert liquid diluent having a boiling point between about 150 and 300° F.

As a next step passing carbon dioxide through said initial reaction mixture at a temperature between about 120 and 200° F. under a pressure sufficient to maintain said alkanol and said inert volatile hydrocarbon diluent (if employed) in a liquid state, e.g., between about 0 and 200 p.s.i.g., until between about 50 and 83%, preferably between 75 and 80 wt. percent, of said hydrated lime is converted into calcium carbonate and filtering the resultant product to recover a clarified filtrate. After filtration the filtrate is normally stripped, e.g., at 200–300° F. under 10–20 mm. Hg pressure to remove any methanol, water and volatilizable diluent which may be present and recovering the desired clarified overbased calcium sulfonate lubricating oil composition as residue. Alternatively and less preferably, the stripping of volatilizable materials may be conducted immediately prior to filtration.

The ingredients in the initial reaction mixture are present in an amount of between about 1:10 and 1:40, preferably between about 1:20 and 1:35, moles of calcium sulfonate per mole of hydrated lime, a weight ratio of calcium sulfonate to diluent lubricating oil of between about 1:2 and 1:6, preferably between about 1:3 and 1:5, a weight ratio of calcium sulfonate to said volatile diluent of between about 1:3 and 1:5, preferably between about 1:3.5 and 1:4.5, a weight ratio of calcium sulfonate to said alcohol of between about 1:0.5 and 1:1.5, preferably between about 1:0.8 and 1:1.2.

The carbonation period is normally between about 0.2 and 12 hours, preferably between about 1 and 4 hours.

In the filtration of the crude overbased calcium sulfonate lubricating oil composition filtration is normally conducted through a stainless steel or cloth plate which may be precoated with filter materials such as diatomaceous silica, diatomaceous, silica mixed with wood fibers, cellulose derived from wood pulp, and etc., at a temperature between about 50 and 200° F. Further, to aid filtration, filter aids are preferably employed in the crude mixture in amounts of between about 1.0 and 15.0 wt. percent based on the crude mixture such as amorphous diatomaceous silica and natural glass derived from volcanic action. Standard filter apparatuses may be employed such as frame filters and bomb filters, preferably filtration is conducted under pressure to speed filtration, e.g., between about 10 and 100 p.s.i.g. Normally, from a commercial standpoint filtrates of at least about 2.0 gals./hr./ft.$^2$ of filter area are acceptable.

Immediately after filtration under preferred conditions the filter cake is washed with a light volatile liquid solvent, preferably the same material employed as volatile diluent during carbonation in order to remove any overbased calcium sulfonate compositions occluded in the filter cake. It has been normally found that up to 25 percent of the run through product is initially trapped in the filter cake. Upon washing of the filter cake the volatilizable diluent is removed and the clarified overbased calcium sulfonate lubricating oil residue is combined with the previously filtered product.

The theorized chemical-physical mechanism taking place in the method of the invention is during the $CO_2$ blowing the hydrated lime is substantially converted to calcium carbonate particles predominantly of a particle size of less than 0.02 micron which are oil dispersable and filterable and do not detract from the clarity of the product. It is believed the calcium sulfonate functions as a dispersing agent for the calcium carbonate particles and may form a surface active coating on said particles. The alcohol and inert volatile hydrocarbon diluents function to aid in the formation of a finely divided calcium carbonate particle.

With the above proposed mechanism in view it is quite surprising to find that a calcium carbonate content in the initial hydrated lime of more than about 1.5 wt. percent will substantially reduce the filterability of the crude product since calcium carbonate is a desired material in the final product. An explanation for this phenomena may be that these initially present calcium carbonate particles may form a nucleus upon which the calcium carbonate produced in situ deposits thereon to form large agglomerated particles which block the filter mechanism. It is to be noted calcium carbonate is normally found in hydrated lime since hydrated lime is generally produced by heating limestone, that is, calcium carbonate to form a calcium oxide and then hydrating the oxide to form the hydrated lime, i.e., calcium hydroxide product. In normal commercial hydrated limes calcium carbonate is usually a substantial impurity.

It is to be noted in conjunction with the materiality of the absence of calcium carbonate in the initial reaction mixture it is also important from a filtration standpoint to stop the carbonation below about 83 percent conversion of the hydrated lime to carbonate. If this maximum is exceeded the rate of filtration of the product is substantially reduced believed due to an agglomeration of the formed calcium carbonate particles. Conversion above about 50 percent are required for satisfactory total base numbers.

In regard to the oil soluble calcium sulfonate charge material as heretofore stated it is either a calcium petroleum sulfonate or a calcium salt of a synthetically prepared alkyl aromatic sulfonic acid. The calcium petroleum sulfonates are for the purposes of this invention derived from mahogany acid and are more correctly termed calcium mahogany sulfonates. As well known in the art, they are prepared by sulfonation of suitable petroleum fractions and after removal of the resulting acid sludge and purification of the sulfonic acid fraction this sulfonic acid fraction is directly neutralized by calcium hydroxide or the corresponding calcium salt may be generally prepared by double decomposition, that is, neutralizing the sulfonic acid fraction with sodium hydroxide or sodium carbonate and then contacting the resulting sodium sulfonate with calcium chloride. The calcium salt of a synthetically prepared alkyl aromatic sulfonic acid may be manufactured in much the same way. In this case, of course, the hydrocarbon which is used as the starting material usually is an alkylated benzene such as, for example, the Friedel-Craft reaction products of benezene and a polymer fraction containing tetrapropylene. A particularly preferred starting material of this type is a polydodecyl benzene. In either case whether sulfonate is derived from a natural petroleum fraction of a synthetic hydrocarbon the molecular weight of the sulfonic acid is advantageously between about 350 and 600, preferably between about 400 and 550.

Hereinafter and hereinbefore we encompass within the definition of the calcium sulfonate charge material, calcium sulfonates which may be all or in part formed in the reaction situ such as charging a sulfonic acid or a mixture of sulfonic acid and normal calcium sulfonate to the method of the invention and adding additional hydrated lime, e.g., between about 0.5 and 0.6 mole hydrated lime per mole sulfonic acid, to that normally employed in order to convert the oil soluble sulfonic acid to calcium sulfonate. A specific example of such a mixture is 20 wt. percent of a calcium petroleum sulfonate of a molecular weight of about 1000 derived from a lubricating oil stock and 80 percent of a sulfonic acid derived from an alkylated benzene of a molecular weight of about 450. Further, within the terms of the invention the calcium sulfonate reactant employed in the initial reaction mixture can include slightly overbased calcium sulfonates, e.g., having calcium metal ratio up to about 2, a TBN up to about 50 and a calcium content up to about 3.0 wt. percent. Still further, by the term "oil soluble" solubility to the extent of at least 5 wt. percent in a hydrocarbon lubricating oil fraction is intended. Also the calcium sulfonate reactant is normally added to the initial reaction mixture as a between about 10 to 90 wt. percent lube oil solution, preferably between about 30 and 70 wt. percent in order to facilitate incorporation therein.

The hydrocarbon lubricating oil employed may be any liquid hydrocarbon material having lubricating properties (e.g. mineral oils) and an SUS viscosity of between about 50 and 300 at 100° F. but normally is a paraffinic base or naphthenic base lubricating oil, preferably having an SUS viscosity at 100° F. of between about 75 and 150.

Specific examples of the alcohols contemplated herein are methanol, ethanol, propanol, butanol, methoxyethanol and ethoxyethanol. Methanol is the most preferred.

In regard to the preferably employed volatilizable hydrocarbon diluent, any inert liquid hydrocarbon material may be employed having boiling points substantially below the lubricating oil vehicle and the decomposition temperature of the reaction mixture. Specifically, examples of such materials are heptane, isoheptane, benzene, toluene, xylene, petroleum naphthas having a boiling point of between about 150 and 300° F.

The following examples further illustrate the method of the invention but are not to be construed as limitations thereof.

EXAMPLE I

This example illustrates the method of the invention and the importance of maintaining the calcium carbonate content in the hydrated lime below about 1.5 wt. percent.

To a 60 gallon stainless steel reactor there was charged 90 lbs. of a 42 wt. percent lubricating oil solution of calcium sulfonate having a molecular weight of about 1000 derived from the sulfonation of a lubricating oil stock, said solution having the following analysis.

| Test: | Result |
|---|---|
| Calcium, wt. percent | 2.8 |
| Sulfur, wt. percent | 2.2 |
| Total base No. | 49.3 |
| Ca metal ratio | 2:1 |
| Visc., 210° F., cs. | 97.6 |
| Sp. gravity, 60/60° F. | 0.9817 |
| Diluent oil, wt. percent | 58 |

In addition there was charged 67 lbs. of naphthenic hydrocarbon lubricating oil of an SUS viscosity of about 100 at 100° F., 131 lbs. of heptane, 32 lbs. of methanol and 67 lbs. of hydrated lime. Agitation was initiated and the reactor vents were blocked off for total reflux conditions. The reaction mixture was heated to 140° F. and 30.5 lbs. of $CO_2$ were charged to the reactor over a 4 hour period under total reflux conditions while maintaining the reactor temperature within the range of 145 and 155° F. At the end of the $CO_2$ charge the reactor was vented to the atmosphere. A 1000 mls. sample thereof was passed into a bomb pressure filter, fitted with a single filter leaf position at the bottom of the cylindrical tank which was maintained at 75° F. The material to be filtered was charged to the filter together with 5 wt. percent diatomaceous silica filter aid based on said material and the filter tank was pressured with nitrogen at 15 p.s.i.g. The recovered product, after stripping at 250° F. at 10 mm. Hg pressure for 3 hours to remove water, methanol and heptane, was a lube oil solution of an overbased calcium sulfonate. Four runs were undertaken, run A representative of the invention and runs B, C, and D being comparative, in that the latter three runs utilized identical conditions of run A except the hydrated lime therein had a calcium carbonate content substantially above 1.5 wt. percent. Calcium carbonate content in the hydrated lime initial reactant and its relation to final product analysis are reported in the following Table I:

TABLE I

| | Run | | | |
|---|---|---|---|---|
| | A | B | C | D |
| Hydrated lime, $CaCO_3$, wt. percent | 1.3 | 4.6 | 5.1 | 5.7 |
| Product (filtered): | | | | |
| Calcium, wt percent | 13.8 | 13.4 | 12.4 | 12.9 |
| Sulfur, wt. percent | 1.3 | 1.3 | 1.6 | 1.3 |
| Ca metal ratio | 18:1 | 18:1 | 18:1 | 18:1 |
| Total base No. | 351 | 321 | 339 | 321 |
| Visc., cs., at 210° F. | 55.5 | 95.2 | 69 | 53.6 |
| Sp. gravity 60/60° F. | 1.21 | ------ | 1.14 | 1.16 |
| HC oil content, wt. percent | 55 | 55 | 55 | 55 |
| Appearance | (1) | (1) | (1) | (1) |
| Filtration rate, gals./hr./ft.² | 8.3 | 0.35 | 1.33 | 1.41 |

[1] Clear.

EXAMPLE II

This example further illustrates the method of the invention and the importance of maintaining the amount of $CO_2$ introduced into the system to between about 50 and 83 wt. percent of the stoichiometric amount necessary to completely react with the hydrated lime.

To a 60 gallon stainless steel reactor there was charged 90 lbs. of a 42 wt. percent solution of a calcium sulfonate in lubricating oil of the type described in Example I, 67 lbs. of naphthenic lubricating oil of an SUS viscosity of 100 at 100° F., 67 lbs. of hydrated lime (1.1 wt. percent $CaCO_3$) and 131 lbs. of heptane, 32 lbs. of methanol. The agitator was initiated, the vents closed and the reactor was set for autoclave conditions by setting the pressure regulator at 50 p.s.i.g. The reaction mixture was heated over a period of 1 hour from ambient to 140° F. Carbon dioxide was then charged to the reactor over a period of 3 hours at 150° F. the particular amounts of $CO_2$ employed varying between the runs. At the end of the $CO_2$ introduction the reactor was vented to the atmosphere and the contents therein heated to 200° F. taking off heptane, methanol and water, the heptane forming in one layer, methanol and water in another. At the end of the stripping the heptane was returned to the reactor and reactor contents were filtered through a bomb leaf pressure filter having a filter area of 0.1 square foot of the type and under the conditions described in Example I. To facilitate filtration in all the runs, 14 wt. percent diatomaceous silica filter aid based on the material to be filtered was employed. Runs A', B', C', D' and E' are representative runs of the invention and runs F' and G' demonstrate the importance of utilizing between about 50 and 83 wt. percent $CO_2$ of stoichiometric basis hydrated lime to respectively obtain satisfactory total base number and filter rate. The relationship between the degree of carbonation, filter rate and total base number of product is set forth below in Table II.

TABLE II

| | Run | | | | | | |
|---|---|---|---|---|---|---|---|
| | A' | B' | C' | D' | E' | F' | G' |
| Wt. percent $CO^2$ of stoichiometric | 50 | 65 | 75 | 80 | 82.5 | 85 | 25 |
| Filter rate, gal./hr./ft.² | 10 | 9.1 | 13 | 4.2 | 3.4 | 0 | ------ |
| TBN of stripped filtrate | 279 | 332 | 375 | 363 | 375 | ------ | 139 |

EXAMPLE III

This example still further illustrates the method of the invention.

The procedure of Example I was essentially repeated utilizing the following ingredients: 32 lbs. methanol, 71 lbs. hydrated lime (0.5 wt. percent $CaCO_3$), 131 lbs. heptane, 18 lbs. calcium sulfonate lube oil solution reactant described in Example I and 37 lbs. of a paraffinic lubricating oil solution containing 80.6 wt. percent sulfonic acid derived from the sulfonation of an alkylated benzene and having a molecular weight of about 450, a sulfur content of 6.29 wt. percent, a specific gravity of 1.0322 at 60/60° F., and a viscosity (cs.) at 210° F.

of 66.6. To the resultant mixture 31 lbs. of carbon dioxide was introduced over a 3 hour period at about 155° F.

The resultant $CO_2$ blown product was filtered at a rate of 10.7 gal./hr./ft.$^2$ at 75° under 15 p.s.i.g. pressure. The filtrate was then stripped at 250° F. under 15 mm. Hg pressure for about 3 hours to remove any water, methanol and heptane present.

The final stripped, filtered product was analyzed and found to be a lubricating oil solution of an overbased calcium alkyl sulfonate of the following analysis as set forth below in Table III.

TABLE III

| Product (filtered): | Result |
|---|---|
| Calcium, wt. percent | 12.8 |
| Sulfur, wt. percent | 1.33 |
| Ca metal ratio | 18:1 |
| Total base No. | 332 |
| Visc., cs., at 210° F. | 12.6 |
| Sp. gravity, 60/60° F. | 1.1254 |
| Appearance | Clear |
| Oil content, wt. percent | 53 |

EXAMPLE IV

This example again illustrates the method of the invention.

The procedure of Example I was essentially repeated except there was charged to the reactor prior to the $CO_2$ blowing 32 lbs. of methanol, 70 lbs. hydrated lime (1.1 wt. percent $CaCO_3$ content), 131 lbs. heptane, 95 lbs. naphthenic lubricating oil having an SUS viscosity at 100° F. of about 100 and 62 lbs. of a 62 wt. percent solution of ammonium sulfonate in lubricating oil having a sulfur content of 4.05 wt. percent, a specific gravity 60/60° F. of 0.9872 and a viscosity (cs.) at 210° F. of 222.1 and a water content of 2.6 volume percent, said sulfonate derived from the sulfonation of a mineral lubricating oil and having a molecular weight of about 440 followed by neutralization with ammonium hydroxide. The corresponding calcium sulfonate reactant was formed in situ. The reaction mixture was blown with 30.5 lbs. (77% of stoichiometric) of $CO_2$, at 150° F. The product was filtered at 75° F. at a rate of 8.8 gal./ft.$^2$/hr. and the filtered, stripped product after stripping at 250° F. at 15 mm. Hg for 3 hours was found to be a lubricating oil solution containing overbased calcium sulfonate, said solution having the analysis as set forth below in Table IV.

TABLE IV

| Product (filtered-stripped): | Result |
|---|---|
| Calcium, wt. percent | 13.1 |
| Sulfur, wt. percent | 1.3 |
| Ca metal ratio | 18:1 |
| Total base No. | 343 |
| Visc., cs., 210° F. | 22.4 |
| Sp. gravity, 60/60° F. | 1.1595 |
| HC oil content, wt. percent | 53 |
| Appearance | Clear |

EXAMPLE V

This example still again illustrates the method of the invention.

The procedure of Example I was essentially repeated except there was charged to the reactor prior to $CO_2$ blowing 5.3 lbs. methanol, 12 lbs. hydrated lime (0.5 wt. percent $CaCO_3$), 25.8 lbs. heptane, 16 lbs. naphthenic lubricating oil having an SUS viscosity at 100° F. of 100 and 6.2 lbs. of a 57.3 wt. percent sulfonic acid in mineral lubricating oil. The sulfonic acid had a molecular weight of about 440 and was derived from the sulfonation of a mineral lubricating oil stock. The reaction mixture was blown with 5.3 lbs. of carbon dioxide (79 wt. percent of stoichiometric) at about 155° F., filtered at 75° F. under 15 p.s.i.g., and stripped at 250° F. at 15 mm. Hg for about 3 hours. The filtered stripped product was found to be a lubricating oil solution containing overbased calcium sulfonate having the following analysis as set forth below in Table V.

TABLE V

| Product (filtered): | Result |
|---|---|
| Calcium, wt. percent | 12.3 |
| Sulfur, wt. percent | 1.0 |
| Ca metal ratio | 20:1 |
| Total base No. | 303 |
| Visc., cs., 210° F. | 15.5 |
| Sp. gravity, 60/60° F. | 1.1213 |
| HC oil content, wt. percent | 60 |
| Appearance | Clear |

We claim:

1. A method of preparing a clarified overbased calcium sulfonate lubricating oil composition comprising contacting an initial mixture of a calcium sulfonate reactant having a metal ratio of from about 1 to 2, a hydrated lime having a calcium carbonate content of less than about 1.5 wt. percent, a hydrocarbon lubricating oil of an SUS viscosity of between about 50 and 300 at 100° F. and an alcohol selected from the group consisting of alkanol and alkoxyalkanol of from 1 to 5 carbons with carbon dioxide at a temperature between about 120 and 200° F., subsequently filtering the resultant carbonate product and recovering said clarified overbased calcium sulfonate composition from the filtrate, said calcium sulfonate reactant selected from the group consisting of calcium petroleum sulfonate and calcium salts of alkyl aromatic sulfonic acids, said calcium sulfonate derived from sulfonic acid of a molecular weight between about 350 and 600, said contacting employing between about 10 and 40 moles of lime per mole of said calcium sulfonate reactant, between about 0.50 and 0.83 mole $CO_2$ per mole of lime, said hydrocarbon lubricating oil being present in a weight ratio of between about 2:1 and 6:1 diluent oil to calcium sulfonate reactant and said alcohol being present in a weight ratio of between about 0.5:1 and 1.5:1 alcohol to sulfonate reactant.

2. A method in accordance with claim 1 wherein the initial reaction mixture also contains an inert, volatilizable hydrocarbon liquid diluent present in a weight ratio of between 3:1 and 5:1 of said diluent to said sulfonate reactant.

3. A method in accordance with claim 2 wherein said sulfonate reactant is a calcium petroleum sulfonate of a molecular weight of about 1000, said alcohol is methanol, said volatilizable diluent is heptane and said lubricating oil diluent is a mineral oil of an SUS viscosity of about 100 at 100° F.

4. A method in accordance with claim 1 wherein the mole ratio of $CO_2$ to lime is between about 0.75:1 and 0.80:1.

5. A method in accordance with claim 1 wherein said sulfonate reactant is a mixture of calcium petroleum sulfonate and sulfonic acid, said alcohol is methanol, said volatilizable diluent is heptane, and said lubricating oil is a mineral lubricating oil of an SUS viscosity of about 100 at 100° F.

6. A method in accordance with claim 2 wherein said alcohol is methanol, said volatilizable hydrocarbon is heptane, said lubricating oil diluent is naphthenic lubricating oil of an SUS viscosity at 100° F. of about 100 and wherein said calcium sulfonate reactant is formed in the reaction situ via the contacting of between about 0.5 and 0.6 mole hydrated lime per mole sulfonic compound of a molecular weight of between about 400 and 550 selected from the group consisting of petroleum sulfonic acid, alkylated aromatic sulfonic acid and ammonium salts thereof.

7. A method in accordance with claim 1 wherein the water content in said initial mixture is less than 1 wt. percent.

(References on following page)

References Cited

UNITED STATES PATENTS

| | | | |
|---|---|---|---|
| 3,027,325 | 3/1962 | McMillen et al. | 252—33 |
| 3,312,618 | 4/1967 | Le Suer et al. | 252—33 |
| 3,429,811 | 2/1969 | Robbins et al. | 252—33 |

FOREIGN PATENTS 593,056 2/1960 Canada.

OTHER REFERENCES

E. M. Levin: Nomograms for Obtaining the Compound Composition of Hydrated Limes From the Oxide Analysis, National Bureau of Standards Miscellaneous Publication 196, Dec. 30, 1949.

DANIEL E. WYMAN, Primary Examiner

W. J. SHINE, Assistant Examiner

U.S. Cl. X.R.

252—18, 25